(12) United States Patent
Nagatsuka et al.

(10) Patent No.: US 7,219,973 B2
(45) Date of Patent: May 22, 2007

(54) IMAGE-FORMING DEVICE AND METHOD

(75) Inventors: Ikutaroh Nagatsuka, Ebina (JP); Tsunemasa Mita, Ebina (JP); Daisuke Tsuda, Ebina (JP); Minoru Koshimizu, Ebina (JP); Yasunori Saito, Ebina (JP); Tsutomu Ishii, Ebina (JP)

(73) Assignee: Fuji Xerox Co., Ltd., Toyo (JP)

( * ) Notice: Subject to any disclaimer, the term of this patent is extended or adjusted under 35 U.S.C. 154(b) by 104 days.

(21) Appl. No.: 10/628,471

(22) Filed: Jul. 29, 2003

(65) Prior Publication Data
US 2004/0130699 A1 Jul. 8, 2004

(30) Foreign Application Priority Data
Dec. 18, 2002 (JP) ............................ 2002-366138

(51) Int. Cl.
*B41J 29/393* (2006.01)
*G03G 15/00* (2006.01)
(52) U.S. Cl. ...................... 347/19; 355/133; 400/74; 399/15
(58) Field of Classification Search ................ 347/19
See application file for complete search history.

(56) References Cited
U.S. PATENT DOCUMENTS
5,369,476 A * 11/1994 Bowers et al. ............... 399/49
5,596,353 A * 1/1997 Takada et al. ................ 347/19
6,489,983 B2 * 12/2002 Miyoshi et al. ............. 347/171

FOREIGN PATENT DOCUMENTS

| JP | 58-107391 | * | 6/1983 | ................. 428/916 |
| JP | 4-39041 | * | 2/1992 | ................. 347/19 |
| JP | 4-39043 | * | 2/1992 | ................. 347/19 |
| JP | A 5-58033 | | 3/1993 | |
| JP | 2000-158797 | * | 6/2000 | |
| JP | A 2001-301233 | | 10/2001 | |
| JP | A 2001-312225 | | 11/2001 | |

* cited by examiner

*Primary Examiner*—Julian D. Huffman
(74) *Attorney, Agent, or Firm*—Oliff & Berridge, PLC

(57) ABSTRACT

The present invention provides an image-forming device that can record an image onto a rewritable image recording medium. Prior to recording a predetermined image, the medium is set and a test image for measuring the density is recorded thereon. When the density is determined to be within an allowable range, the predetermined image is recorded under certain image recording conditions and then discharged to a discharging tray. However, should the density be outside the allowable range, the conditions are changed and another test image is recorded to the medium. If after repeated density measurements the density is not within an allowable range, the device determines that the medium is defective and discharges it to an error tray.

22 Claims, 12 Drawing Sheets

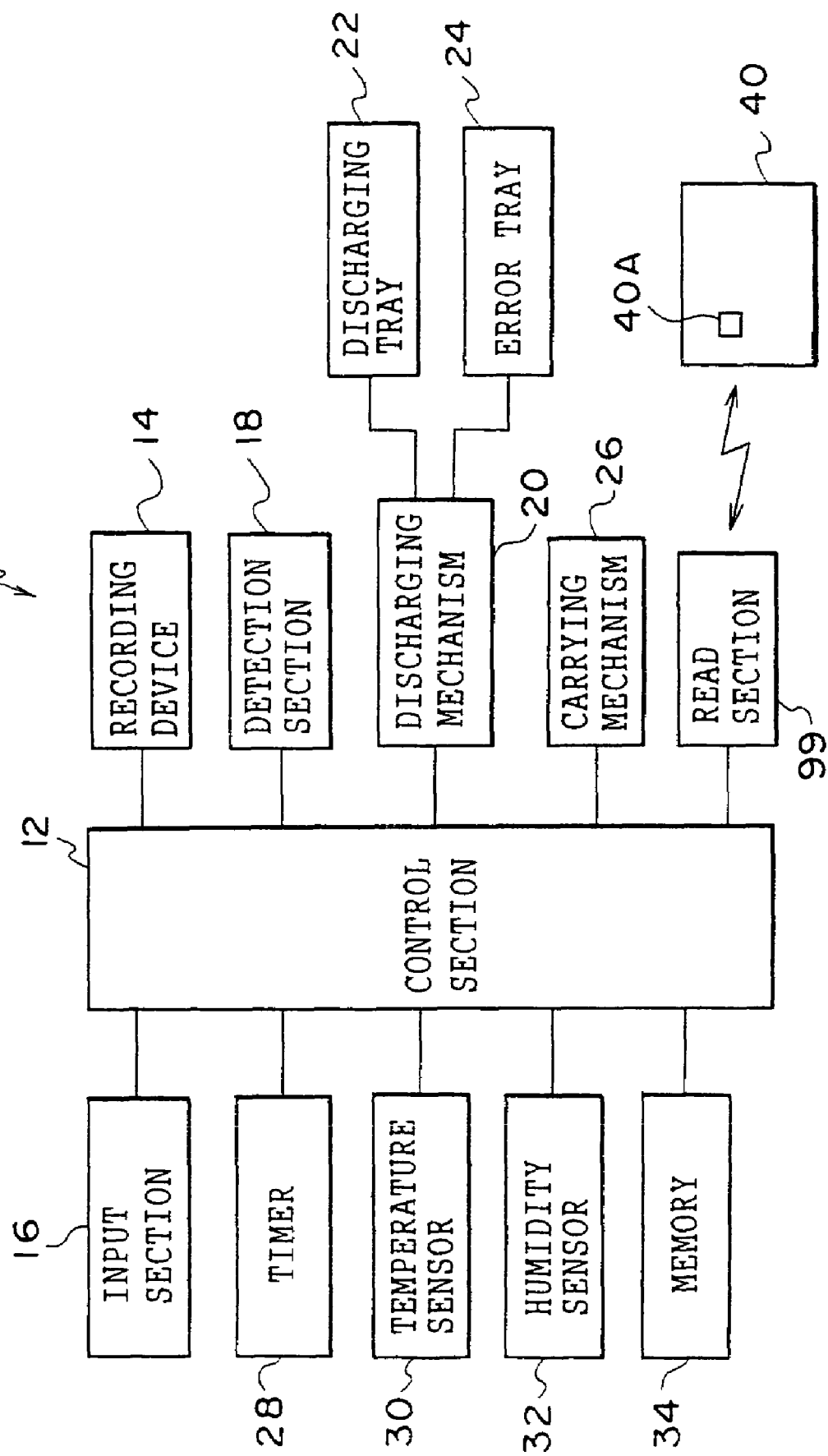

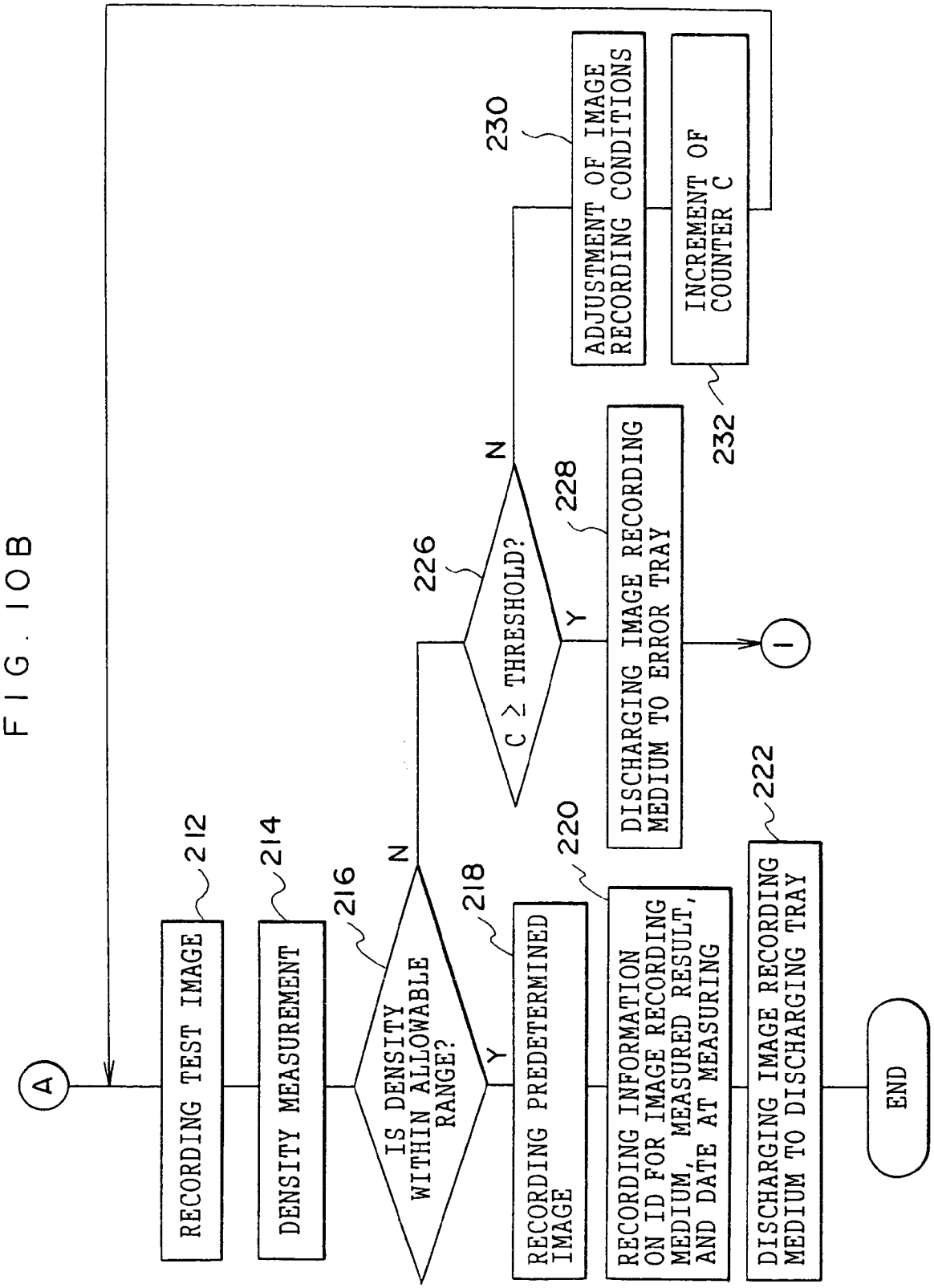

IMAGE-FORMING DEVICE AND METHOD

CROSS-REFERENCE TO RELATED APPLICATION

This application claims priority under 35 U.S.C. 119 from Japanese Patent Application No. 2002-366138, the disclosure of which is incorporated by reference herein.

BACKGROUND

The present invention relates to an image-forming device and, more particularly, to an image-forming device such as a copying machine and a printer, which can form an image on a rewritable image recording medium. The present invention also relates to an image-forming method.

Conventionally, most image recording media, such as thermal recording paper and plain paper for a plain paper copier (PPC) used for an image forming device such as a copying machine and a printer, have not been able to be reused because an image cannot be deleted once the image is recorded thereon.

Therefore, resources such as forest resources used to make paper for such media have been wasted, causing problems such as environmental damage and loss of earth resources.

In order to solve the above problems, an image forming device using reusable and reversible image recording media has been proposed, wherein an image recorded on an image recording medium is deleted and another image can be recorded.

For example, Japanese Patent Application Laid-Open (JP-A) No. 5-58033 has disclosed an image forming device using a reversible thermosensitive recording medium, which can rewrite an image with heat, and JP-A No. 2001-301233 has disclosed an image forming device using rewritable display recording medium which can rewrite an image with light.

However, image deterioration tends to occur in the above conventional rewritable media when they are repeatedly used. Thereby, in order to obtain suitable image quality, it has been necessary to select writing conditions suitable for the characteristics of each image recording medium. Moreover, there are cases where a predetermined level of image quality is not obtained even under adjusted writing conditions, such as when the image recording medium is repeatedly used more than a certain number of times, and, in such a case, it is determined that the image recording medium is no longer usable.

In the case of an image forming device using conventional image recording media such as thermal recording paper and paper for a PPC, the image recording medium has typically been used only once. There has been no concept that the image quality deteriorates and the medium becomes unusable, and only components of the main body of the image forming device become unusable. Accordingly, management against the deterioration of the image quality and unusable components has been comparatively easy.

However, in the case of the image recording medium which can be repeatedly rewritten, there has been a problem in that it is difficult to maintain excellent image quality because there are different use histories for each image recording medium. This causes complications in the setting of the optimal image recording conditions and difficulties in determination of the end of the service time for the image recording medium.

SUMMARY

The present invention has been made in order to solve the above problems and its object is to provide an image forming device which can record an image on a rewritable image recording medium under optimal image recording conditions and to maintain excellent image quality.

To this end, a first aspect of the present invention is to provide an image forming device comprising a recording section for recording an image on a rewritable image recording medium; a control section for controlling the recording section so that a test image for testing the image recording medium is recorded on the image recording medium; a detection section for detecting the test image recorded on the image recording medium; and a determination section for determining whether the detection section's detection result is within an allowable range or not.

According to the invention, the recording section records an image on rewritable image recording medium. The rewritable image recording medium means reversible image recording medium by which an image can be repeatedly rewritten in a visible manner, and which has a function as a memory of images and can be reused. Here, the function as a memory means a function by which recorded images can be maintained on the image recording medium after recording the images even without external action.

A thermosensitive recording sheet with reversibility, which has been disclosed in the above-described JP-A No. 5-58033 and by which an image can be rewritten by use of heat, and display recording medium, which has been disclosed in the above-described JP-A No. 2001-301233 and by which an image can be rewritten by an optical signal, may be listed as such image recording medium with reversibility. Moreover, an image recording medium, which has been disclosed in, for example, JP-A No. 2001-312225 and has a configuration in which a plurality of kinds of particles with different colors and electrostatic characteristics are sealed between one pair of substrates, and, on which an image is displayed by appropriately moving the particles according to the image with means for applying the voltage between the substrates, may be included as such image recording medium with reversibility.

Accordingly, for example, when the thermosensitive recording sheet with reversibility is used as the image recording medium, the recording section is configured to include thermal heads and the like provided with a plurality of heating elements corresponding to pixels. Moreover, when the display recording medium, by which an image can be rewritten by an optical signal is used as the image recording medium, the recording section is configured to include an optical output device which emits an optical signal according to an image to be recorded to the display recording medium, a voltage application section which applies the voltage according to the image to the display recording medium, and the like. Moreover, when the image recording medium with a configuration in which a plurality of kinds of particles with different colors and electrostatic characteristics are sealed between one pair of substrates is used as the image recording medium, the recording section is configured to include a voltage application section which applies the voltage according to the image between the substrates in the image recording medium.

The control section controls the recording section so that the test image for testing of the image recording medium is recorded on the image recording medium. The test image is an image by which it is determined for confirmation whether an excellent image is recorded on the image recording medium or not, and, for example, an image for confirmation of density, which is one of image characteristic values, can be used as the test image. This test image is detected by the detection section. It is determined by the decision section whether the detection result in the detection section is within the allowable range or not, that is, whether an image can be recorded with excellent image quality or not.

Since the test image is recorded in the rewritable image recording medium and it is determined whether the detection result of the test image is within the allowable range, the optimal image recording conditions can be set, based on the determination results. Thereby, even when images are repeatedly written on the image recording medium, excellent image quality can be maintained.

Here, heat quantity supplied to heating elements in the thermal head and the like are included in the image recording conditions when the thermosensitive recording sheet with reversibility is used as the image recording medium. Moreover, when the rewritable display recording medium, on which an image can be rewritten with an optical signal, is used as the image recording medium, light quantity of the optical signal emitted to the display recording medium, the voltage applied to the display recording medium and the like are included in the image recording conditions. Moreover, the voltage applied between the substrates in the image recording medium and the like are included in the image recording conditions when the image recording medium with a configuration in which a plurality of kinds of particles with different colors and electrostatic characteristics are sealed into one pair of substrates is used as the image recording medium.

Here, the control section controls the recording section so that before a predetermined image to be recorded on the image recording medium is recorded on the image recording medium, the test image is recorded on the image recording medium, and when the detection result is outside the allowable range, image recording conditions for recording the predetermined image on the image recording medium are set based on the detection result.

According to the invention, the control section controls the recording section before a predetermined image to be recorded on the image recording medium is recorded on the image recording medium, so that the test image is recorded on the image recording medium.

And, image recording conditions for recording the predetermined image on the image recording medium are set, based on the detection result, when it is determined by the decision section that the detection result of the test image in the detection section is outside the allowable range. For example, when the detection result is outside the allowable range, the image recording conditions are changed, the test image is recorded again and determination is executed again in a similar manner to the above one. The above processing is repeated until the detection result is within the allowable range and image recording conditions for which the result is within the allowable range are set as image recording conditions for recording the predetermined image.

Then, when the detection result is within the allowable range, the predetermined image to be recorded on the image recording medium is recorded under the image recording conditions for which the test image has been recorded.

Thus, excellent image quality can be maintained even when images are repeatedly recorded because the predetermined image is recorded after adjustment of image recording conditions when the detection result of the test image is outside the allowable range.

Moreover, the predetermined image is recorded on the image recording medium, based on the image recording conditions set by the control section, when the detection result is within the allowable range.

Moreover, the control section controls the recording section so that the predetermined image to be recorded on the image recording medium and the test image are simultaneously recorded on the image recording medium, and sets image recording conditions for recording the predetermined image on the image recording medium, based on the detection result when the detection result is outside the allowable range.

According to the invention, the control section controls the recording section so that the predetermined image and the test image to be recorded on the image recording medium are simultaneously recorded on the image recording medium. And, image recording conditions for recording of the predetermined image on the image recording medium are set, based on the detection result when it is determined by the decision section that the detection result by the detection section is outside the allowable range. For example, when the detection results are outside the allowable range, the image recording conditions are changed, the test image and the predetermined image are recorded on the same image recording medium again under the image recording conditions newly set and determination is executed again in the same manner as the above. The above processing is repeated until the detection result is within the allowable range.

The test image recorded on the image recording medium is deleted when the detection result is within the allowable range. Thereby, only the predetermined image is recorded onto the image recording medium.

Thus, excellent image quality can be maintained even when images are repeatedly recorded, because the test image and the predetermined image are recorded on the image recording medium again after adjustment of the image recording conditions when the detection result of the test image is outside the allowable range.

Here, there may be applied a configuration in which the image recording conditions are changed and the test image and the predetermined image are recorded on another image recording medium, when the detection result is outside the allowable range. Moreover, there may be applied a configuration in which only the predetermined image is recorded on another image recording medium, when the detection result is within the allowable range.

Moreover, the control section discharges the image recording medium to a discharging tray for defective media, when the detection result in the detection section is outside the allowable range even after the image recording conditions have been changed more than once and the test image is recorded and detected.

According to the invention, it is determined that the image recording medium is defective when the detection result of the test image in the detection section is outside the allowable range even after the image recording conditions are repeatedly changed and the test image is recorded and detected. The image recording conditions are changed more than once within a changeable range. That is, it is determined that the image recording medium is defective when the detection result is not within the allowable range over a changeable range of image recording conditions.

Furthermore, the image recording medium is configured to be discharged to a discharging tray for defective medium other than the tray on which a normal image recording medium is discharged when it is determined that the image recording medium is defective. Thereby, a state in which defective image recording medium and normal recording media are mixed can be prevented.

The control section controls the recording section so that test images are simultaneously recorded on the image recording medium under a plurality of differing image recording conditions, and sets the image recording conditions, based on each detection result of each test image recorded under each differing image recording condition.

According to the invention, the control section controls the recording section so that the test images are simultaneously recorded on the image recording medium under a plurality of different image recording conditions. The plurality of test images are detected in the detection section, respectively. Then, it is determined by the decision section whether each of the detection results is within the allowable range.

Subsequently, the image recording conditions are set, based on each of detection results of the test images which have been recorded under the plurality of different image recording conditions. More specifically, for example, when there are among the above detection results a plurality of detection results which are within the allowable range, image recording conditions corresponding to the optimal detection result among the plurality of detection results are set as image recording conditions for recording the predetermined image. On the other hand, when none of the detection results is within the allowable range, it is determined that the image recording medium is defective, and the medium is discharged to, for example, a discharging tray for defective media.

Thus, since the image recording conditions are set, based on each of the detection results of the test images which have been recorded on the image recording medium under the plurality of different image recording conditions from the beginning, the optimal image recording conditions can be quickly set.

Moreover, the image recording medium is provided with storage medium on which an identification code is stored, the image forming device further comprising: a read section for reading the identification code stored on the storage medium; and a history storage section for storing histories of image recording conditions for the predetermined image recorded on the image recording medium, and histories of the detection results, wherein the control section stores the image recording conditions and the detection results in the history storage section in relation to the identification codes by the control section.

According to the invention, the image recording medium is provided with a storage medium on which identification codes have been stored. That is, the image recording medium is provided with a storage medium in which a unique identification code representing the image recording medium has been stored. Media, which can be read by an external reading section, with or without contact, may be used as the storage medium.

The control section stores the image recording conditions under which the predetermined image has been recorded and the detection results in the history storage section of the device in relation to the identification codes read by the read section. The detection results and the image recording conditions are sequentially stored to form histories of the detection results and the image recording conditions, and the detection results and the image recording conditions can be managed for each image recording medium.

Moreover, the control section sets image recording conditions for recording the predetermined image, based on the histories stored in the history storage section.

According to the invention, the image recording conditions are set in the control section, based on the histories, that is the histories of the historical image recording conditions and the detection results. More specifically, a tendency of changes in the image recording conditions and the detection results is obtained and the image recording conditions are set, based on the obtained tendency. Thereby, the optimal image recording conditions can be quickly set. Moreover, it is possible to determine from the histories when the end of the service time for the image recording medium comes.

Furthermore, the image recording medium is provided with a storage medium onto which the control section stores image recording conditions for the predetermined image recorded on the image recording medium and detection results.

According to the invention, the image recording conditions and the detection results are recorded not in the side of the device, but in that of the image recording medium. Thereby, the historical image recording conditions and the detection results of the image recording medium can be obtained even from other devices.

Moreover, the control section sets the image recording conditions for recording the predetermined image based on the image recording conditions and the detection results stored in the storage medium.

According to the invention, since the image recording conditions are set, using the historical image recording conditions and the detection results, which have been stored in the history storage section of the image recording medium, the image recording conditions can be appropriately set and, at the same time, it is possible to predict the end of the service life time.

Moreover, the detection section detects the display densities of the test image.

According to the invention, for example, a test image with the highest density of the color which can be recorded is recorded in the image recording medium by the control section. Preferably, the above processing is executed for all colors which can be recorded. Then, the detection section detects the display density of the test image. Thus, since the display density is detected and the image recording conditions are set, based on the detection result, appropriate density can be maintained at any time and excellent image quality can be kept even when images are repeatedly rewritten.

Moreover, an image can be rewritten on the image recording medium with an optical signal.

Since images can be more quickly written with an optical signal in comparison with a case in which images are recorded on thermal recording paper, the throughput of the device can be improved.

A second aspect of the present invention is to provide an image forming method comprising: recording a test image for testing rewritable image recording medium on the medium, based on predetermined image recording conditions; detecting image-characteristic values of the test image recorded on the image recording medium; and determining whether the detected image-characteristic values are within an allowable range or not.

The method further comprises recording a predetermined image on the image recording medium, based on the predetermined image recording conditions, when it is determined that the detection result is within the allowable range.

In addition, the method further may comprise changing the predetermined image recording conditions so that the detected image-characteristic values approach the allowable range, when it has been determined that a detection result is outside the allowable range; and recording the test image on the image recording medium, based on the changed image recording conditions.

The steps of changing the image recording conditions; recording the test image on the image recording medium, based on the changed image recording conditions; detecting the image-characteristic values; and determining whether the detection result is within the allowable range are repeated until it is determined that the image-characteristic values are within the allowable range.

Also, the steps of: changing the image recording conditions; recording the test image on the image recording medium, based on the changed image recording conditions; detecting the image-characteristic values; and determining whether the detection result is within the allowable range are repeated until a number of repetitions reaches a predetermined number.

Moreover, the method further comprising storing at least one of image recording conditions for at least one image recorded on the image recording medium, and the detected image-characteristic values, wherein the predetermined image recording conditions are defined based on at least one of the stored image recording conditions and the image-characteristic values.

BRIEF DESCRIPTION OF THE DRAWINGS

FIG. 9 is a schematic block diagram of an image forming device according to a third embodiment.

DETAILED DESCRIPTION OF EMBODIMENTS

First Embodiment

Figure 1:
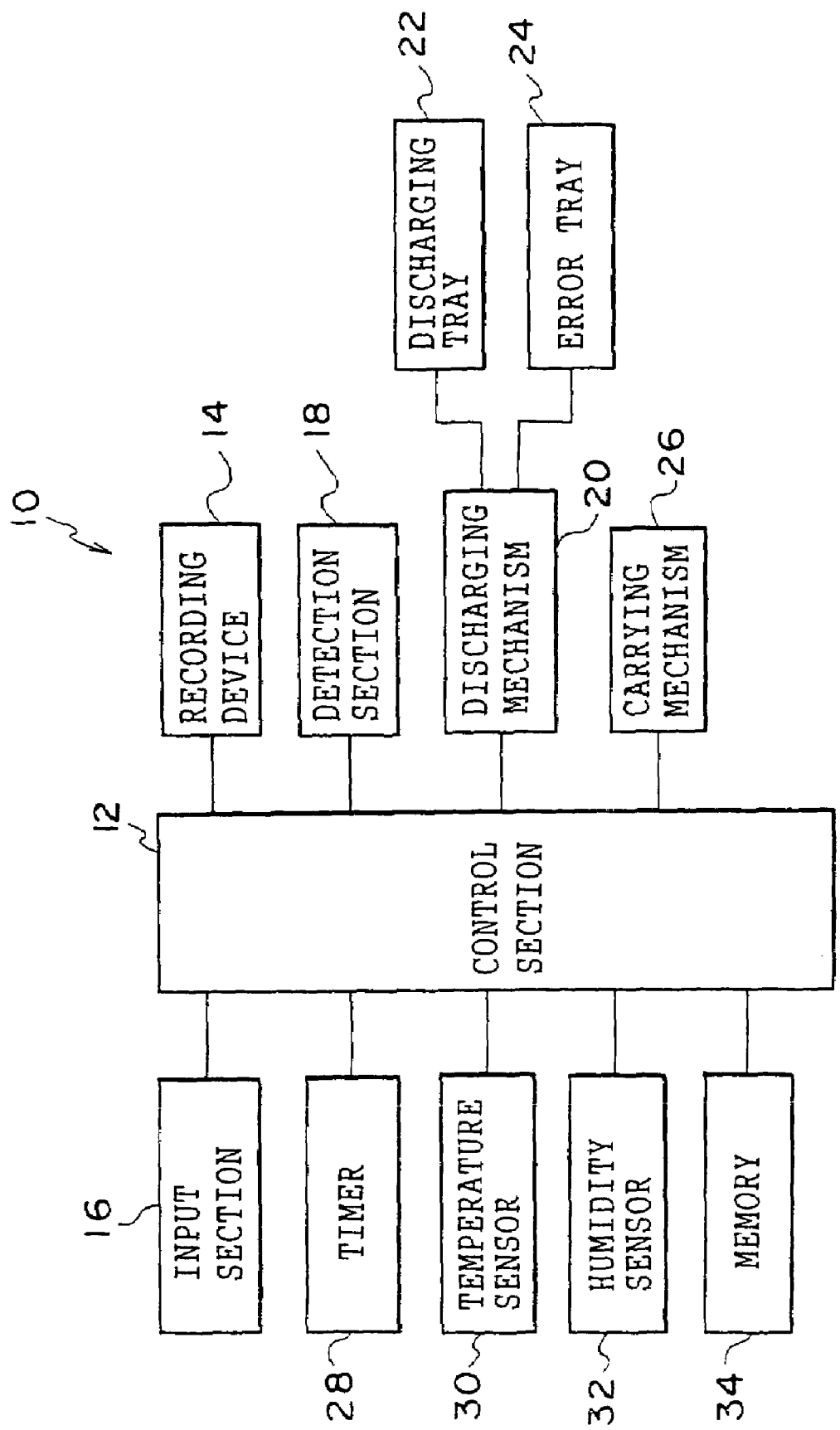
FIG. 1 is a schematic block diagram of an image forming device.

Hereinafter, a first embodiment of the present invention will be explained in detail, referring to the drawings.

FIG. 1 shows a block diagram of an image forming device 10 to which the invention is applied. As shown in FIG. 1, the image forming device 10 comprises: a control section 12; a recording device 14; an input section 16; a detection section 18; a discharging mechanism 20; a discharging tray 22; an error discharging tray (error tray) 24; a carrying mechanism 26; a timer 28; a temperature sensor 30; a humidity sensor 32; and a memory 34.

The input section 16 is an interface for inputting image information and the image information input by the input section 16 is output to the recording device 14 by the control section 12.

The recording device 14 operates according to an instruction from the control section 12 and an image is recorded on the rewritable image recording medium which will be described later, based on the image information input from the input section 16. In the embodiment, a case in which an image recording medium on which an image can be rewritten by an optical signal is used as rewritable image recording medium will be explained.

Figure 2:
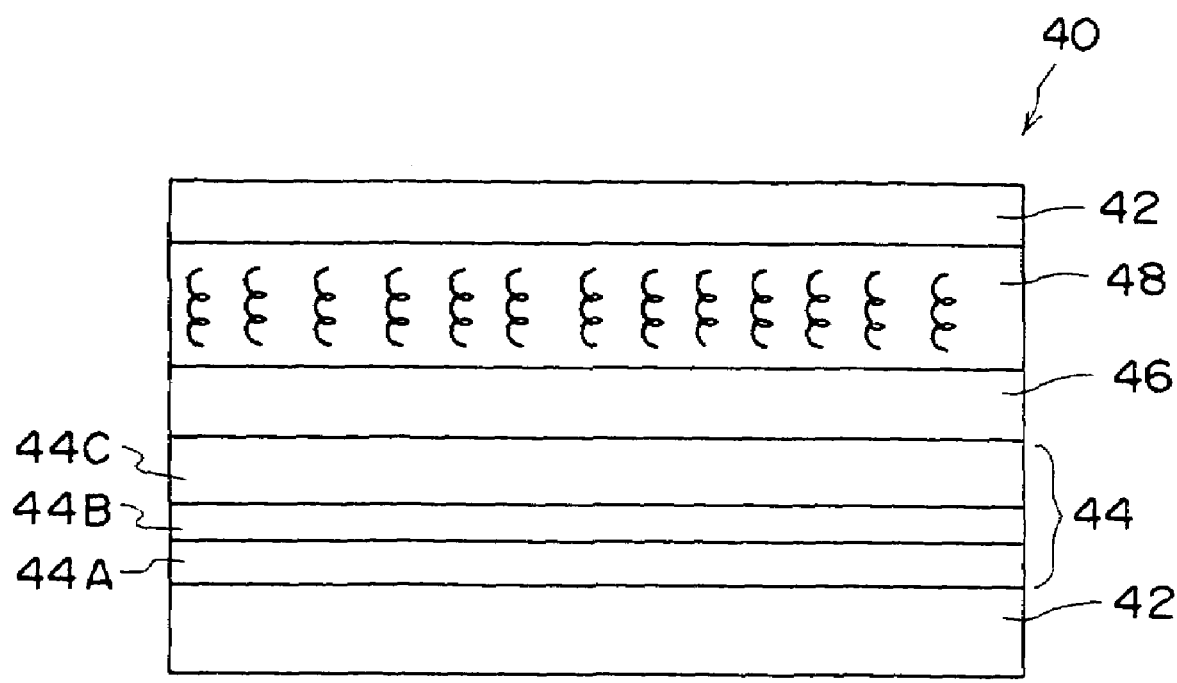
FIG. 2 is a cross section of an image recording medium.

The image recording medium and the recording device which have been described in JP-A No. 2001-301233 described in the above "Summary of the Invention" may be used as the image recording medium and the recording device 14 in the embodiment. FIG. 2 shows a cross section of such an image recording medium 40.

As shown in FIG. 2, the image recording medium 40 is formed in a sheet shape and comprises a photo-conductive layer 44 which is a photosensitive layer, a light-shielding layer 46, and a display layer 48, which are inserted between a pair of substrates 42. Moreover, the photo-conductive layer 44 comprises a electrical charge production layer 44A, a electrical charge transport layer 44B, and a electrical charge production layer 44C, which are layered in this order.

Each of the substrates 42 comprise, for example, a PET (Poly-Ethylene Terephthalate) film which is provided with an Indium Tin Oxide (ITO) electrode on an inner side. The display layer 48 comprises, for example, a nematic liquid crystal with positive dielectric anisotropy.

Figure 3:
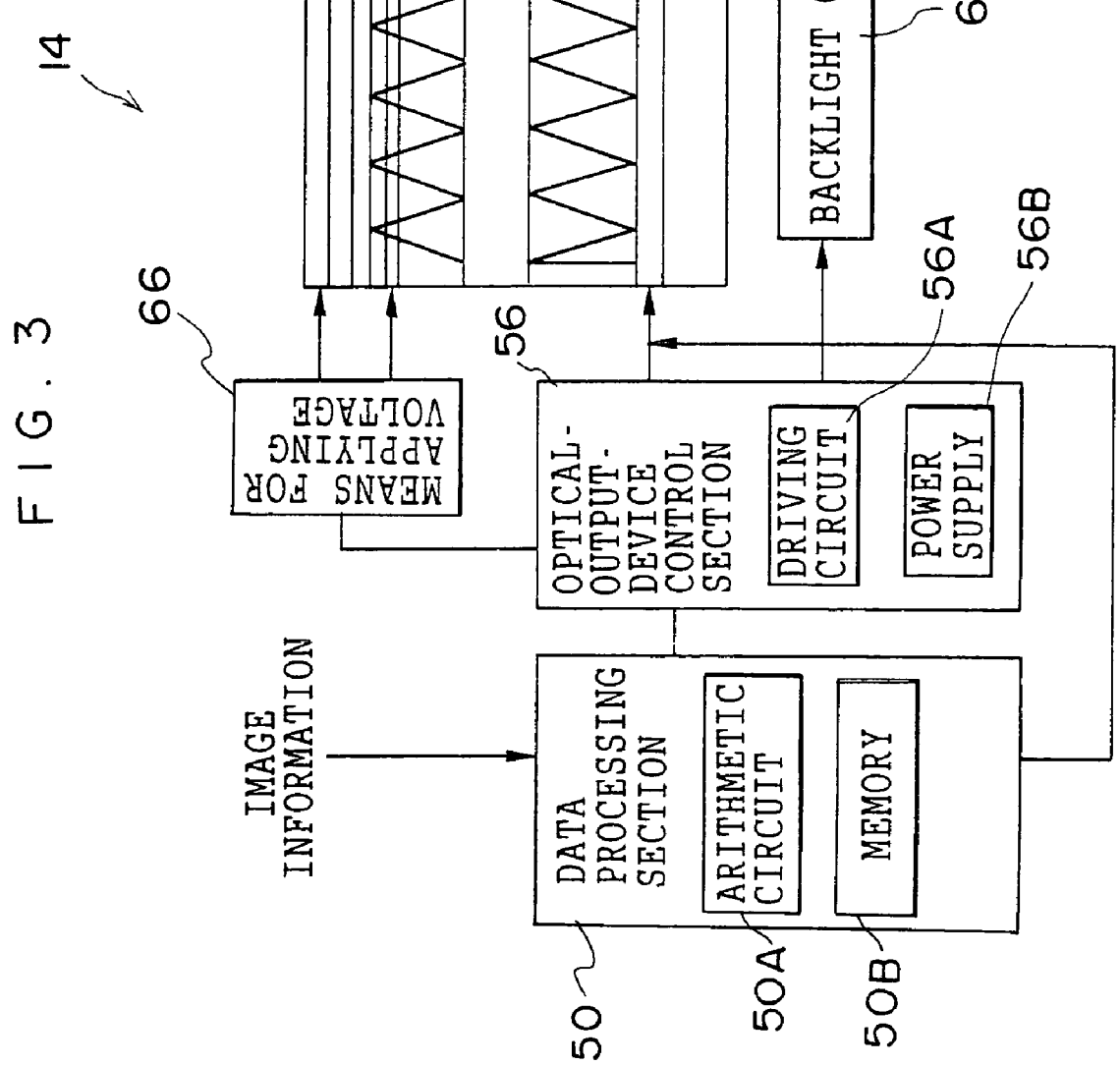
FIG. 3 is a schematic block diagram of a recording device.

FIG. 3 shows the image recording device 14 for recording an image on the image recording medium 40. The recording device 14 is a device by which the image based on the image information input from the control section 12 is written on the image recording medium 40 with the optical signal.

As shown in FIG. 3, the recording device 14 is provided with a data processing section 50. The control section 12 outputs the image information input from the input section 16 to the data processing section 50.

The image information undergoes conversion processing in an arithmetic circuit 50A of the data processing section 50 and is converted into an information signal, which is suitable for an optical output device 52. That is, operation such as interpolation and reduction of data is appropriately executed so that the number of pixels of the image information is compatible with the number of pixels of the optical output device 52, depending on whether that of the image information is larger or smaller than the maximum number of pixels with which the optical output device 52 can execute batch exposure. More specifically, the operation of reduction in the image information is executed when the number of pixels of the image information is larger than the maximum number of pixels with which the optical output device 52 can execute batch exposure. On the other hand, the operation of interpolation of the image information is executed when the number of pixels of the image information is smaller than the maximum number of pixels with which the optical output device 52 can execute batch exposure. The information obtained by the operations is stored in a memory 50B.

Moreover, the recording device 14 is provided with the optical output device 52 which forms an optical pattern, based on an information signal, which has undergone the conversion processing in the data processing section 50, for the optical output device 52 and emits the optical pattern.

The optical output device 52 comprises a transmission type LCD (liquid crystal display) 54 which functions as an optical pattern emitting face. The transmission type LCD 54 is configured to be connected to an optical-output-device control section 56 which drives and controls the LCD 54.

An ordinary LCD-backlight 58 having an optical waveguide and a cold-cathode tube waveguide at the end of the waveguide is provided at the back of the transmission type LCD 54. The backlight 58 is connected to a backlight control circuit 60 which drives and controls the backlight 58.

And, a two-dimensional microlens array 62 is arranged on the upper side of the transmission type LCD 54. The two-dimensional microlens array 62 is located by spacers (not shown) so that an optical pattern which is formed on the transmission type LCD 54 based on the information signal for the optical output device, is focused on the surface of the photoconductive layer 44 in the image recording medium 40.

Particularly, since a transparent support plate 64 is put on the spacers, over which the image recording medium 40 is arranged, so that the upper side of the two dimensional microlens array 62 is covered by the transparent support plate 64. Thus, the focus is spontaneously adjusted by setting the image recording medium 40 in tight contact with the transparent support plate 64. Here, the image recording medium 40 is arranged on the transparent support plate 64 so that the substrate 42 nearer to the photoconductive layer 44 in the image recording medium 40 and the transparent support plate 64 are opposing each other.

When the photoconductive layer 44 and the display layer 48 are used together for a configuration of the image recording medium 40, the recording device 14 and the image recording medium 40 are electrically connected to each other and the means for applying voltage to an ITO electrode formed on the substrate 42 of the image recording medium 40 is required. Accordingly, a voltage application section 66 is provided in the recording device 14.

The voltage application section 66 is configured to apply a voltage pulse, which is required to drive the display layer 48 of the image recording medium 40, to the above ITO electrode at timing in synchronization with that of the optical output device 52 in the recording device 14. The voltage pulse is generated in a power supply 56B including an AC power supply and a DC power supply. Here, the ITO electrode formed on the substrate 42 of the image recording medium 40 and the voltage application section 66 are detachable.

The voltage pulse may be generated by voltage transformation and shaping of voltage wave, based on the AC power supply, or by manual ON/OFF switching of the DC power supply which is supplied from a battery such as electric cells. Furthermore, a pulse with a required wave form may be generated from the DC power supply, using a switching circuit. For example, a circuit, which comprises a wave-form storage section like a ROM, a D/A conversion section and a control section may be used for the above pulse generation. In the circuit, a wave form read out from the ROM at application of the voltage undergoes D/A conversion. And, means for generating a pulse by a method like an electric circuit such as a pulse generating circuit can be used. In addition, in order to set the timing of the voltage application section 66 and the exposure timing of the optical output device 52 in synchronization with each other, the voltage may be applied to the image recording medium 40, based on an electric trigger detecting an exposure state and a driving state of the optical output device 52.

Hereinafter, one specific example of the recording device 14 will be explained, referring to FIG. 4.

A rectangular opening 70 is provided on the upper side of a box-type case 68 of the recording device 14 and a transparent glass plate 72 is fitted into the opening 70 to form a display window 74. The inside of the case 68 is divided into two layers of upper and lower layers, among which the lower layer forms a media storing section 76 which stores the later-descried image recording medium 40. A discharging slot 78 from which the image recording medium 40 is discharged is provided at one end (the left end in FIG. 4) of the media storing section 76 and a feed roller 80 is arranged near the discharging slot 78. Moreover, the image recording medium 40 in the media storing section 76 can be taken out by the driving power of the feed roller 80 one-by-one.

On the other hand, the optical output device 52 which displays an image is provided in the upper layer of the case 68. That is, the backlight 58 and the like are provided in the upper layer of the case 68. Moreover, arrangement space 82 for the image recording medium 40 is provided just under the transparent glass plate 72 and two pairs of carrying rollers 84, 86 are provided at the ends of the arrangement space 82, respectively. A loading slot 88 and a discharging slot 90 of the image recording medium 40 are provided on the side walls near the pairs of the carrying rollers 84, 86.

Figure 4:
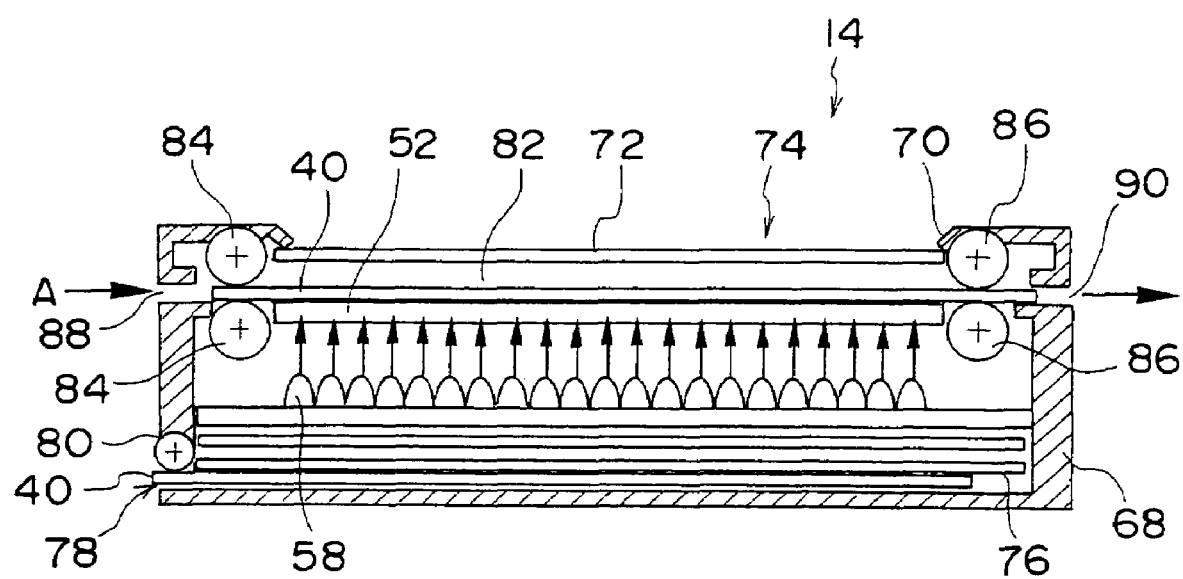
FIG. 4 is a schematic block diagram of the recording device.

The image recording medium 40 taken out from the media storing section 76 is loaded through the not-shown carrying mechanism into the loading slot 88 in the direction of the arrow A shown in FIG. 4. Thereby, the image recording medium 40 is positioned in the arrangement space 82 in an approximately parallel state to the transparent glass plate 72, by being carried by driving force of the pair of carrying rollers 84. Under such a state, the optical output device 52 is controlled by the optical-output-device control section 56, based on the input image information and, at the same time, light corresponding to the image is exposed to the image recording medium 40 by applying of the voltage to the image recording medium 40 with the voltage application section 66 to form the image.

The image recording medium 40 on which the image has been recorded is discharged from the discharging slot 90 by the driving force of the pair of carrying rollers 86 at the right side in a state with the image is displayed.

Figure 5:
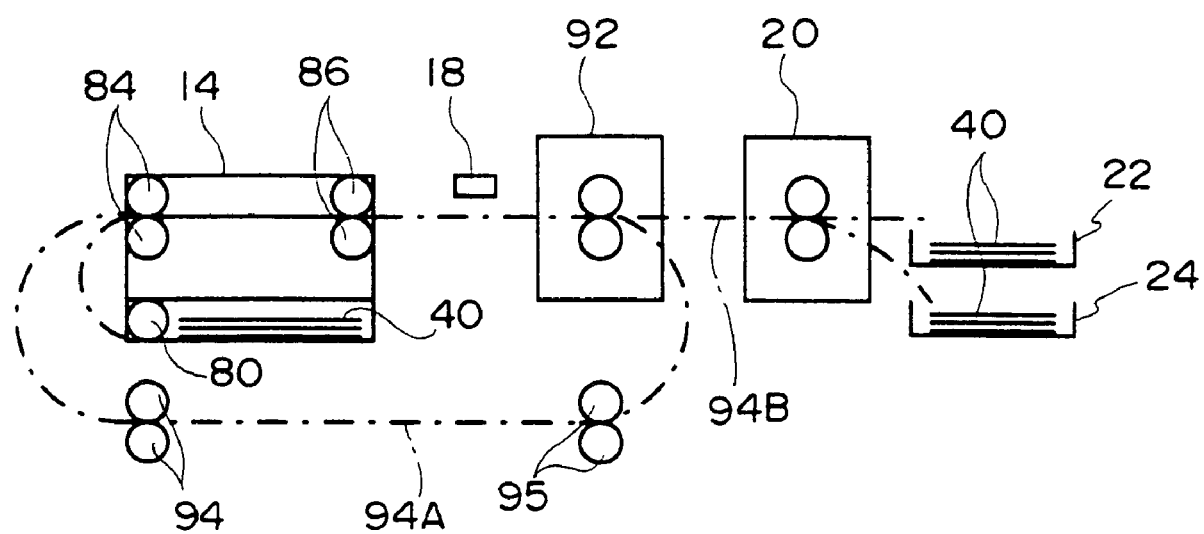
FIG. 5 is an explanatory view of a carrying path of the image forming device.

Though the details will be described later, the image recording medium 40 discharged from the recording device 14 is carried to the position of the detection section 18, as shown in FIG. 5, and a test image recorded on the image recording medium 40 is detected if necessary. And, a carrying path of the image recording medium 40 is switched by a path switching mechanism 92 according to a detection result.

The path switching mechanism 92 switches the carrying path of the image recording medium 40 to a carrying path 94A or 94B. When the carrying path 94A is selected, the image recording medium 40 is carried again into the recording device 14 by the driving force of pairs of carrying rollers 95, 96. When the carrying path 94B is selected, the image recording medium 40 is carried into the discharging mechanism 20 and is discharged to either the discharging tray 22 or the error tray 24 according to the detection result. Here, the path switching mechanism 92, the pairs of carrying rollers 95, 96, and the like form a part of the carrying mechanism 26.

The detection section 18 includes a density sensor which can detect spectral reflection densities of colors such as white, black, yellow, magenta, cyan, red, green, and blue.

The timer 28 is provided to get the current time. The function of the temperature sensor 30 is to detect the temperature around the device. The humidity sensor 32 is installed for detection of the humidity around the device. The memory 34 is provided to store a later-described control-routine program and various kinds of data.

Here, the control section 12 corresponds to a control section and a decision section in the invention, the recording device 14 corresponds to a recording section of the invention, the detection section 18 corresponds to a detection section of the invention and the error tray 24 corresponds to a discharging tray for defective medium in the invention.

Figure 6:
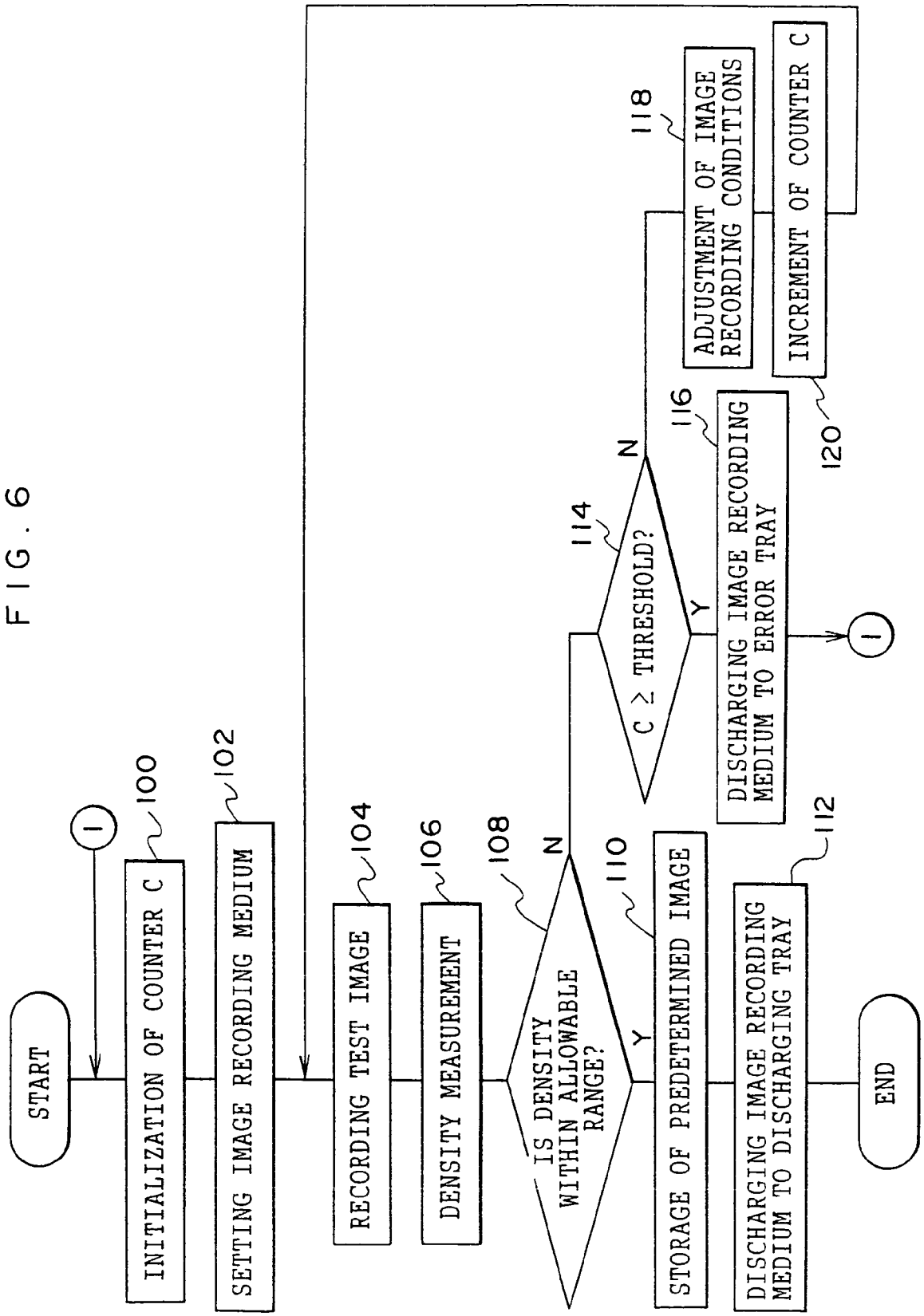
FIG. 6 is a flow chart of a control routine according to a first embodiment.

Then, the control routine to be executed in the control section 12 will be explained as an operation of the embodiment, referring to a flow chart shown in FIG. 6.

In the first place, a value of a counter C which counts how many times the later-described density measurement has been executed is initialized at STEP 100. Here, '1' is assigned for the value of the counter C.

The carrying mechanism 26 is controlled at STEP 102 so that the image recording medium 40 is moved from the media storing section 76 and is set in the arrangement space 82.

Figure 7A:
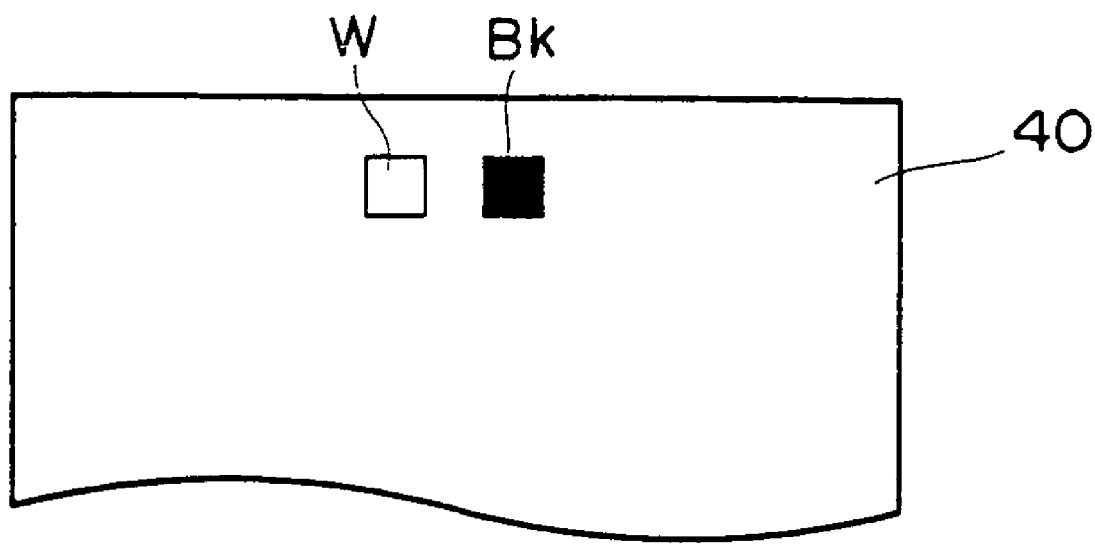
FIG. 7A and FIG. 7B are views of patches for density measurement.
Figure 7B:
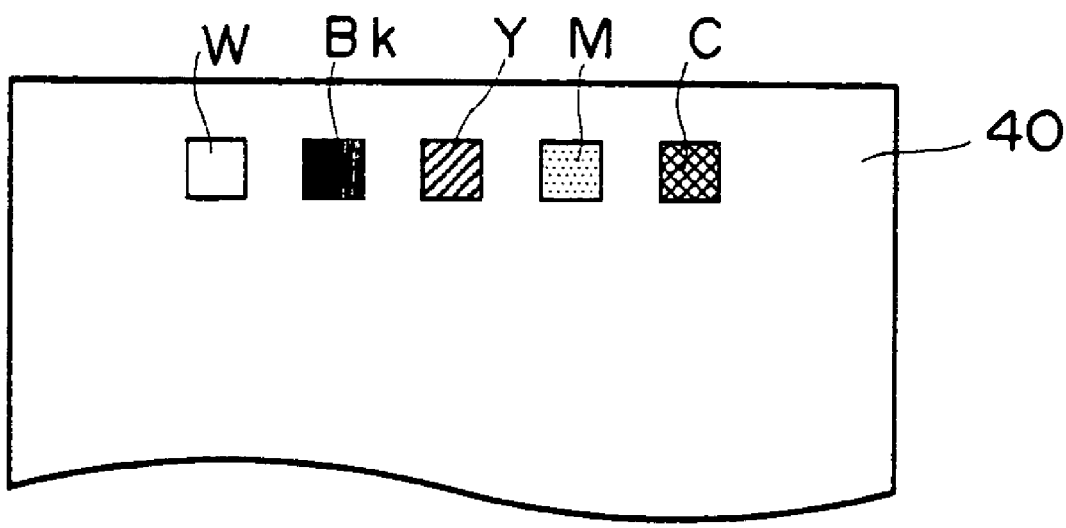

The recording device 14 is controlled at STEP 104 so that a test image including patches W, BK for density measurement of white and black as shown in FIG. 7(A) is recorded on the image recording medium 40, if an image to be recorded is a monochrome image. Here, if an image to be recorded is a color image, the recording device 14 is controlled so that a test image including patches Y, M, C for density measurement of yellow, magenta, and cyan in addition to the patches W, BK for density measurement of white and black as shown in FIG. 7(B) is recorded on the image recording medium 40. The recording device 14 records the test image on the image recording medium 40 under predetermined image recording conditions. In the embodiment, the image recording conditions are the voltage applied by the voltage application section 66 to the image recording medium 40 and the quantity of light of the optical pattern output from the optical output device 52 outputs.

More specifically, the control section 12 outputs the image information about the test image as shown in FIG. 7(A) to the recording device 14, and instructs recording the test image. Thereby, the image information about the test image is input to the data processing section 50 and is stored in the memory 50B after predetermined operations are executed in the arithmetic circuit 50A. Then, the driving circuit 56A in the optical-output-device control section 56 reads an information signal for the optical output device from the memory 50B in the data processing section 50.

Subsequently, the driving circuit 56A supplies a driving signal and a lighting signal respectively to the transmission type LCD 54 and the backlight 58 in the optical output device 52 according to the information signal for the optical output device. Here, there is set a configuration in which, once the backlight 58 is lighted, lighting is continued during set time until a SWITCH-OFF signal is input. Accordingly, SWITCH-ON/OFF is not executed when an optically written image is updated.

As described above, the optical output device 52 emits the optical pattern corresponding to the test image by driving the transmission type LCD 54 and the backlight 58. Thereby, the optical pattern corresponding to the test image is in a state in which the pattern is irradiated on the photoconductive layer 44 of the image recording medium 40. However, the voltage is not supplied to the ITO electrode formed on the inside of the substrate 42 in the image recording medium 40 and the image has not been reproduced at this stage.

Then, the predetermined voltage (for example, the bias voltage pulse of a rectangular wave) is applied to an electrode terminal of the image recording medium 40 by the voltage application section 66. When the predetermined voltage is applied, the reflective image according to the optical pattern is recorded on the display layer 48 of the image recording medium 40. In detail, when the voltage is applied (the bias voltage pulse is supplied), impedance change corresponding to an exposure pattern from the optical output device 52 is generated in the photoconductive layer 44. And, there is a state in which the voltage is selectively applied on the display layer 48 laminated on the photoconductive layer 44 on which the impedance change has been generated. Under such a state, application of the voltage to the whole image recording medium 40 is released and the exposure by the optical output device 52 is completed. The test image is recorded on the display layer 48 of the image recording medium 40 after completion of the exposure and release of the voltage application as a reflective image according to the exposure pattern. The image recording medium 40 on which the test image has been recorded has the function as the memory, and even when the terminal for voltage application is removed, the display contents can be maintained without an electric source, the medium 40 being separated from the recording device 14.

The image recording medium 40 on which the test image has been recorded is carried by the carrying mechanism 26 to the position of the detection section 18 and stopped at the position.

The detection section 18 is controlled at STEP 106 so that the densities of the patches for density measurement are detected by the detection section 18.

Subsequently, it is determined for each patch for density measurement at STEP 108 whether the measured densities are within an allowable range or not. Then, the processing proceeds to STEP 110 when all of the measured densities are within the allowable range. The processing proceeds to STEP 114 when any one of the measured densities for the colors is outside the allowable range.

The recording device 14 is controlled at STEP 110 so that the predetermined image to be recorded in the image recording medium 40 is recorded therein. That is, the predetermined image is recorded in the image recording medium 40 by the same processing as that of the test image. Here, since the predetermined image replaces the test image, the test image will not be left on the image recording medium 40.

Subsequently, the path switching mechanism 92 and the discharging mechanism 20 are controlled at STEP 112 so that the image recording medium 40 on which the predetermined image has been recorded is discharged to the discharging tray 22 for a normal image recording medium 40. That is, the path switching mechanism 92 is controlled so that the carrying path 94B is selected. Thereby, the image recording medium 40 on which the predetermined image has been recorded is carried on the carrying path 94B. Then, the discharging mechanism 20 is controlled to discharge the image recording medium 40 to the discharging tray 22.

On the other hand, it is determined at STEP 114 whether the value of the counter C is larger than a threshold or not. When the value of the counter C is not smaller than the threshold value, it is decided that the image recording medium 40 is no longer usable.

Then, the processing proceeds to STEP 116 when the value of the counter C is not smaller than the threshold value and the processing proceeds to STEP 118 when the value of the counter C is smaller than the threshold value.

It is determined that the image recording medium 40 comes to the end of the service time, and the path switching mechanism 92 and the discharging mechanism 20 are controlled at STEP 116 so that the image recording medium 40 is discharged to the error tray 24. Thereby, the image recording medium 40 which comes to the end of the service time is discharged to the discharging tray which is different from a tray for a normal image recording medium 40. Then, the processing returns to STEP 100 and the above described processing is executed for another image recording medium.

On the other hand, the image recording conditions such as the quantity of light which the optical output device 52 outputs and the value of the voltage which the voltage application section 66 outputs are adjusted at STEP 118. That is, the quantity of light which the optical output device 52 outputs and the value of the voltage which the voltage application section 66 outputs are adjusted to increase the measured density when the density is lower than the allowable range, and the quantity of light which the optical output device 52 outputs and the value of the voltage which the voltage application section 66 outputs are adjusted to reduce the measured density when the density is higher than the allowable range. Here, there may be applied a configuration in which a look-up table defining a relation between the image recording conditions and the densities has been stored in the memory 34 beforehand and the image recording conditions may be changed according to the look-up table.

The value of the counter C is incremented at STEP 120 and the processing returns to STEP 104. Thereby, the above described density measurement is executed under new image recording conditions. Then, the image recording medium 40 is discharged to the discharging tray 22 when all of the measured densities for the colors are within the allowable range and the image recording medium 40 is discharged to the error tray 24 when any one of the measured densities for the colors is outside the allowable range.

Thus, before the predetermined image is recorded, the test image is recorded, and the density of the test image is detected to determine whether the densities are within the allowable range or not. The predetermined image is recorded when it is within the allowable range. Accordingly, the optimal image recording conditions can be set, based on the determination result. Thereby, images are repeatedly written on the image recording medium 40 and excellent image quality can be maintained even when the characteristics of the image recording medium 40 have changed.

The embodiment has been described above in which the image is recorded on the image recording medium according to an optical signal. But the image recording medium is not limited to the above one and the invention can be applied to any kind of rewritable image recording medium. For example, when rewritable thermal recording paper is used, the predetermined image may be recorded after the test image is deleted. In this case, the heat quantity supplied to a thermal head is the image recording condition.

Second Embodiment

Subsequently, a second embodiment according to the invention will be explained. Here, parts similar to those previously described with reference to the first embodiment are denoted by the same reference numbers, and detailed description will be eliminated.

Because an image forming device according to the second embodiment is the same as the image forming device 10 which has been explained in the first embodiment, the explanation will be eliminated.

Figure 8:
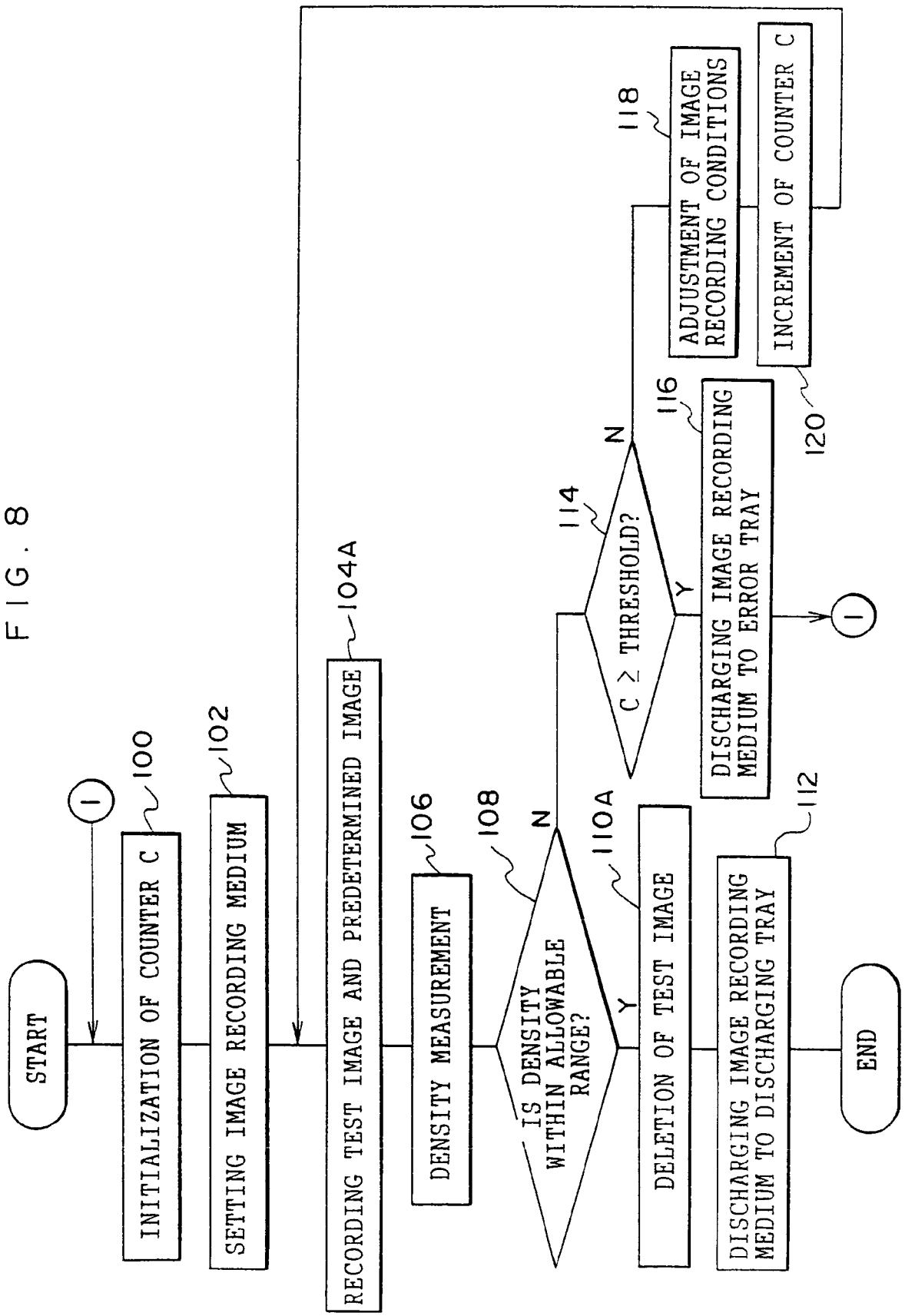
FIG. 8 is a flow chart of a control routine according to a second embodiment.

A control routine, which is executed as an action of the embodiment in a control section 12, will be explained, referring to a flow chart shown in FIG. 8. Here, steps for processing similar to those in the flow chart in FIG. 6 are denoted by the same reference numbers, and only different steps will be explained.

In the embodiment, the value of a counter C is initialized at STEP 100 and the image recording medium 40 is set at STEP 102. Not only a test image, but also a predetermined image are recorded on an image recording medium 40 at the same time at STEP 104A.

Then, when it is determined at STEP 108 that all of the measured densities for the colors are within the allowable range, a recording device 14 is controlled so that only the test image is deleted at STEP 110A.

As described above, since the test image and the predetermined image are recorded at the same time, only deletion of the test image is required when the densities are within the allowable range.

Third Embodiment

Now, a third embodiment of the invention will be explained. Here, parts similar to those previously described with reference to the above embodiments are denoted by the same reference numbers, and the detailed description will be eliminated. In the embodiment, a case in which an image recording medium 40 is provided with a storage medium in which an ID has been stored as an identification code will be explained.

FIG. 9 shows an image forming device 11 according to the embodiment. The image forming device 11 shown in FIG. 9 is provided with a read section 99 for a reading function. Since other components are similar to those of the image forming device 10 shown in FIG. 1, the explanation will be eliminated.

The image recording medium 40 is provided with a storage medium 40A in which a unique ID has been stored and the read section 99 can read ID stored in the storage medium 40A using the contactless technique such as radio communication.

Moreover, though the details will be described later, historical measured density-data are stored in a memory 34 for a history storage section as a history in relation to IDs.

Figure 10A:
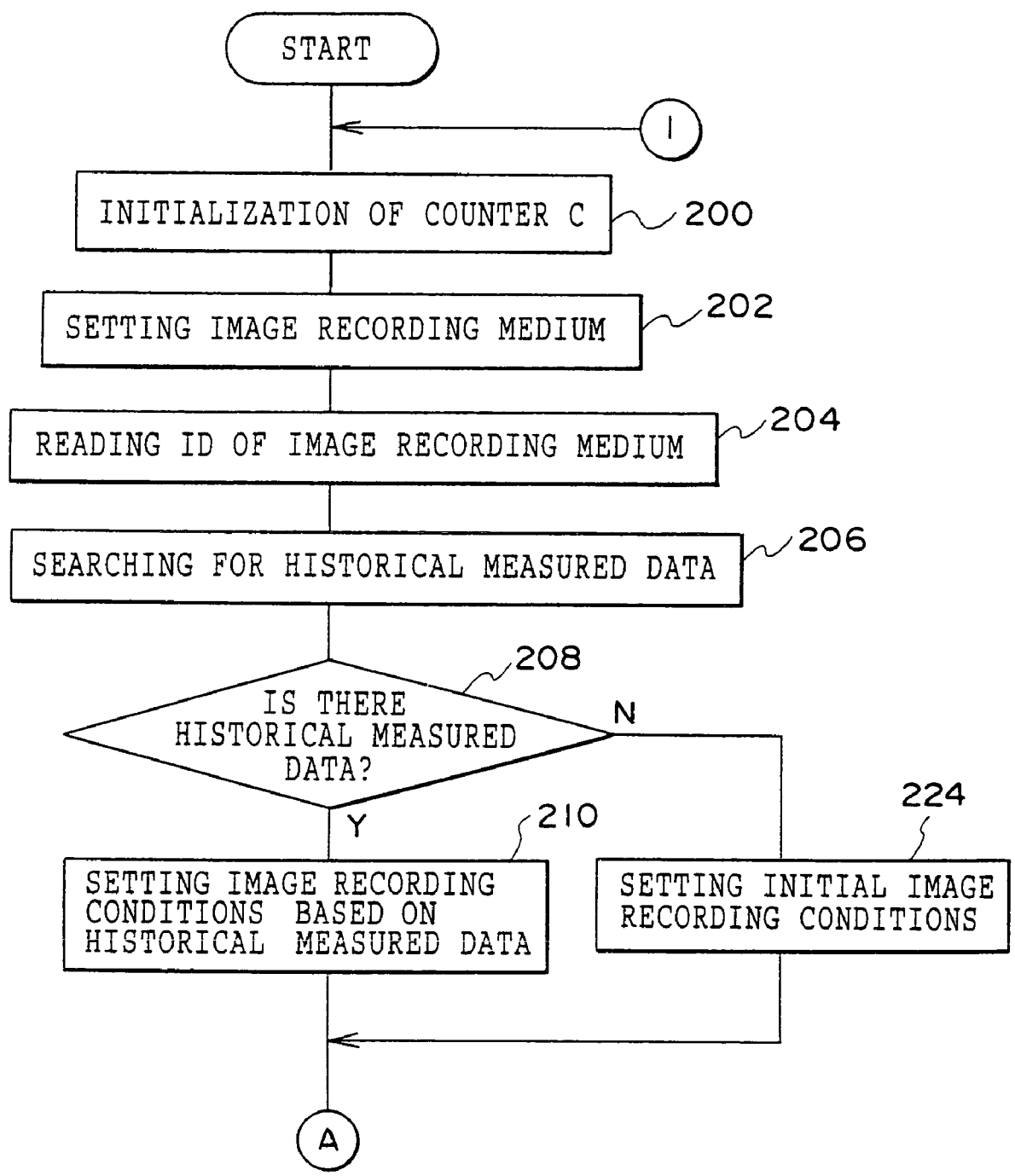
FIG. 10 A and FIG. 10 B are flow charts of a control routine according to the third embodiment.

Then, a control routine, which is executed as an action of the embodiment in a control section 12, will be explained, referring to a flow chart shown in FIGS. 10A and 10B.

The value of the counter C is initialized at STEP 200 and a carrying mechanism 26 is controlled at STEP 202 in such a way that the image recording medium 40 is moved from a media storing section 76 and located in a arrangement space 82.

The read section 99 is controlled at STEP 204 in such a way that an ID stored in the storage medium 40A of the set image recording medium 40 is read.

It is determined at STEP 206 whether there is historical measured data corresponding to the read ID in the memory 34 or not. Then, the processing proceeds to STEP 210 when there is the historical measured data, and the processing proceeds to STEP 224 when there has been no historical measured data.

The image recording conditions are set at STEP 210, based on the historical measured data, that is, the history.

Here, measurement data include measured density values, image recording conditions, dates that measurement have been conducted, temperatures, humidity values and the like.

The image recording conditions are set, using the above measured data. For example, the previous image recording conditions may be set as the current image recording conditions, or the current image recording conditions may be determined based on a tendency of changes in the historical image recording conditions. On the other hand, image recording conditions which have been defined beforehand are set for initial image recording conditions at STEP 224.

Then, a test image is recorded on the image recording medium 40 at STEP 212 under the set image recording conditions.

A detection section 18 is controlled at STEP 214 in such a way that the densities of patches for density measurement recorded on the image recording medium 40 are detected by the detection section 18.

Subsequently, it is determined with regard to each patch for density measurement at STEP 216 whether the measured densities are within an allowable range or not. Then, the processing proceeds to STEP 218 when all the measured densities are within the allowable range, and the processing proceeds to STEP 226 when any one of the measured densities for each color is outside the allowable range.

The recording device 14 is controlled at STEP 218 in such a way that a predetermined image to be recorded in the image recording medium 40 is recorded.

Subsequently, a date on which the above recording is executed is acquired by a timer 28, a value of temperature at the recording is acquired by a temperature sensor 30 and a value of humidity at the recording is acquired by a humidity sensor 32 at STEP 220. Then, the above data, image recording conditions at the recording, measured density values and the like are stored as measurement data in the memory 34 in relation to IDs.

Then, a path switching mechanism 92 and a discharging mechanism 20 are controlled at STEP 222 in such a way that the image recording medium 40 on which the predetermined image has been recorded is discharged to a discharging tray 22 to which a normal image recording medium is discharged. Thereby, the image recording medium 40 is discharged to the discharging tray 22.

On the other hand, it is determined at STEP 226 whether a value of the counter C is larger than a threshold or not. Then, the processing proceeds to STEP 228 when the value of the counter C is larger than the threshold value. The processing proceeds to STEP 230 when the value of the counter C is smaller than the threshold value.

It is determined that the image recording medium 40 comes to the end of the service time, and the path switching mechanism 92 and the discharging mechanism 20 are controlled at STEP 228 in such a way that the image recording medium 40 is discharged to an error tray 24. Thereby, the image recording medium 40 which comes to the end of the service time is discharged to the error tray 24. Then, the processing returns to STEP 200 and the similar series of processing to the above ones are executed for another image recording medium.

On the other hand, the image recording conditions, that is, the quantity of light which an optical output device 52 outputs and the value of the voltage which a voltage application section 66 outputs are adjusted at STEP 230. That is, the quantity of light which the optical output device 52 outputs and the value of the voltage which the voltage application section 66 outputs are adjusted to increase the densities when the measured densities are lower than the allowable range, and the quantity of light which the optical output device 52 outputs and the value of the voltage which the voltage application section 66 outputs are adjusted to reduce the densities when the densities are higher than the allowable range.

The value of the counter C is incremented at STEP 232 and the processing returns to STEP 212. Thereby, a test image is recorded under new image recording conditions and the density measurement is executed in a similar manner to the above-described one. The image recording medium 40 is discharged to the discharging tray 22 when all of the measured densities for the colors are within the allowable range and the image recording medium 40 is discharged to the error tray 24 when any one of the measured densities for the colors is outside the allowable range.

As described above, since image recording conditions are set, based on historical measured data, optimal image recording conditions can be quickly set and the throughput of the device can be improved.

Here, though there has been explained in the above description a configuration in which the measured data is stored in the memory 34 at the side of the device, the data may be configured to be stored in the storage medium 40A of the image recording medium 40. In this case, the historical measured data is read from the storage medium 40A and image recording conditions may be set, based on the measured data. Moreover, only the previous measured data may be configured to be stored in the storage medium 40A when the storage capacity of the storage medium 40A is small. In this case, the image recording conditions which has been stored in the storage medium 40A may be set as the current image recording conditions.

Moreover, there may be a configuration in which a test image and a predetermined image are recorded at the same time, and the test image may be deleted later when the densities become within the allowable range.

Fourth Embodiment

Then, a fourth embodiment of the invention will be explained. Here, parts similar to those previously described with reference to the above embodiments are denoted by the same reference numbers, and the detailed description will be eliminated. An image forming device according to the fourth embodiment is the same as the image forming device 11 which has been explained in the third embodiment, the explanation will be eliminated.

Figure 11:
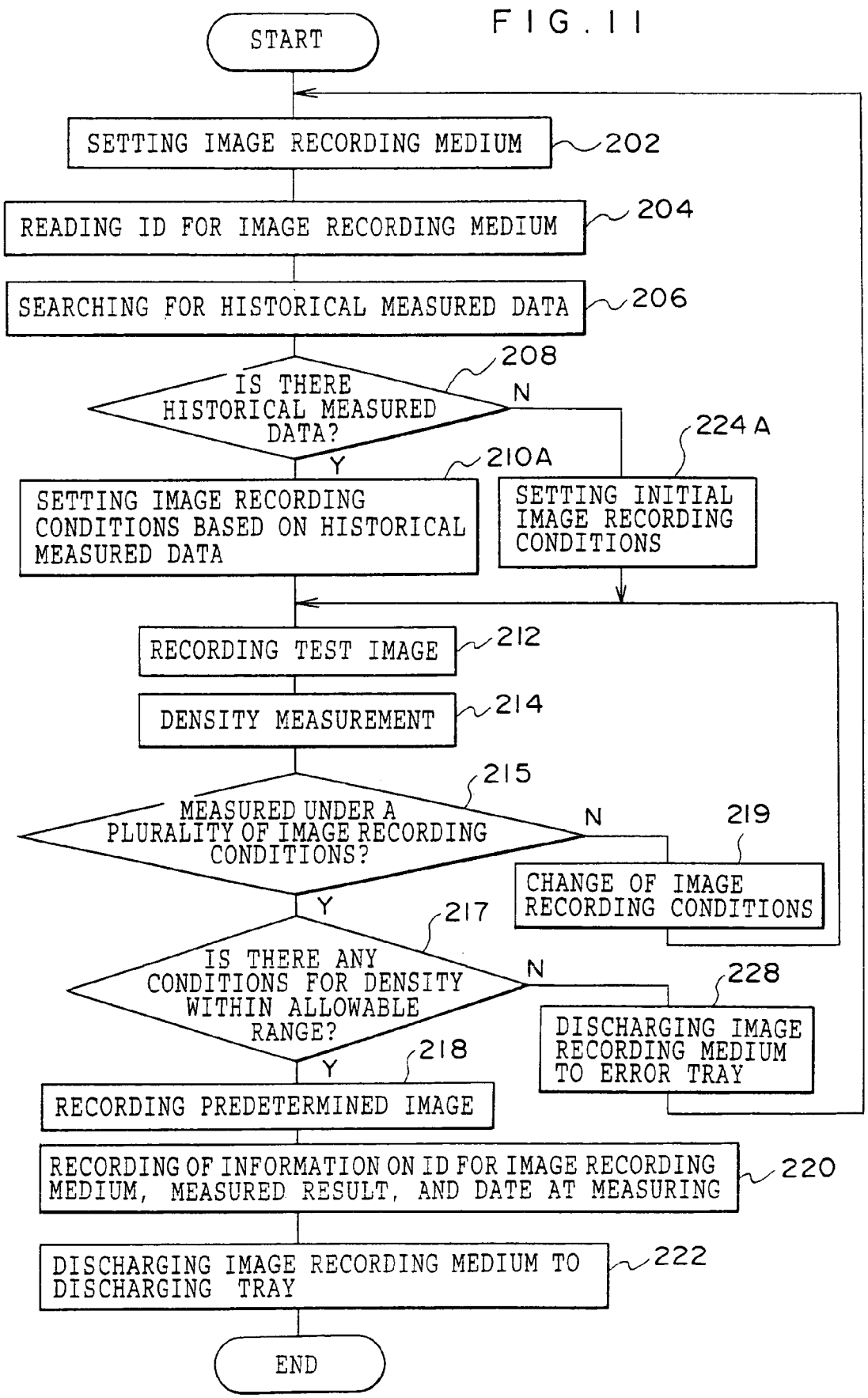
FIG. 11 is a flow chart of a control routine according to a fourth embodiment.

Subsequently, a control routine, which is executed as an action of the embodiment in a control section 12, will be explained, referring to a flow chart shown in FIG. 11. Here, steps for processing similar to those in the flow chart in FIGS. 10A and 10B are denoted by the same reference numbers, and only different steps will be explained.

An image recording medium 40 is set at STEP 202, an ID is read from a storage medium 40A of the image recording medium 40 at STEP 204, the historical measured data corresponding to the ID is searched in a memory 34 at STEP 206. It is determined at STEP 208 whether there is the historical measured data or not.

It is determined whether historical measured data exists in the memory 34 or not. Then, when historical measured data exists, a plurality of different image recording conditions are set at STEP 210A, based on the historical measured data. For example, other image recording conditions may be set, centering on the previous image recording conditions, or other image recording conditions may be set, centering on seemingly optimal image-recording-conditions which are obtained on the basis of a tendency of changes in the historical image recording conditions. On the other hand, when the historical measured data does not exist, a plurality of predetermined image recording conditions are set for the initial image recording conditions at STEP 224A.

Subsequently, a test image is recorded at STEP 212 on the image recording medium 40 under one image recording condition which has been selected from a plurality of set image recording conditions.

A detection section 18 is controlled at STEP 214 so that the densities of patches for density measurement are detected by the detection section 18.

It is determined at STEP 215 whether the density measurement has been executed for all the image recording conditions or not. When the density measurement has been executed for all the image recording conditions, the processing proceeds to STEP 217, and the processing proceeds to STEP 219 when the density measurement has not been executed for any one of the image recording conditions.

The image recording conditions are changed at STEP 219 to image recording conditions which are different from the measured image recording conditions and under which measurement has not been executed. Subsequently, the processing proceeds to STEP 212. Thereby, a test image is recorded under other image recording conditions and the density measurement is executed. The above processing is repeated until the density measurement is completed for all the image recording conditions.

Subsequently, when the density measurement is completed for all the image recording conditions which have been set, it is determined at STEP 217 whether any one of measured densities is within an allowable range or not. The processing proceeds to STEP 218 when any one of measured densities is within the allowable range, and the processing proceeds to STEP 228 when all the measured densities are not within the allowable range.

A recording device 14 is controlled at STEP 218 in such a way that a predetermined image is recorded on the image recording medium 40 under image recording conditions on which the densities are within the allowable range. Here, when there are a plurality of image recording conditions on which the densities are within the allowable range, the most appropriate image recording condition is adopted from the plurality of the image recording conditions.

Subsequently, a date on which the above recording is executed is acquired by a timer 28, a value of temperature at the recording is acquired by a temperature sensor 30 and a value of humidity at the recording is acquired by a humidity sensor 32 at STEP 220. Then, the data, image recording conditions at the recording, measured density values and the like are stored as measurement data in the memory 34 in relation to IDs.

Subsequently, a path switching mechanism 92 and a discharging mechanism 20 are controlled at STEP 222 in such a way that the image recording medium 40 on which the predetermined image has been recorded is discharged to a discharging tray 22 for the normal image recording medium 40. Thereby, the image recording medium 40 is discharged to the discharging tray 22.

It is decided that the image recording medium 40 comes to the end of the service time, and the path switching mechanism 92 and the discharging mechanism 20 are controlled at STEP 228 in such a way that the image recording medium 40 is discharged to an error tray 24. Thereby, the image recording medium 40 which comes to the end of the service time is discharged to the error tray 24. Then, the processing returns to STEP 202, at which similar series of processing to the above ones are executed for another image recording medium.

Thus, since a plurality of image recording conditions are set, based on the historical measured data, density measurement is executed, and an image is recorded after selecting the optimal image recording condition considering the measured results, the optimal image recording condition can be more quickly set in comparison with a case in which image recording conditions are changed until measured densities become within the allowable range. Thereby, the throughput of the device can be improved.

Moreover, though the measured data is configured to be stored in the memory 34 at the side of the device in the above embodiment, the data may be configured to be stored in the storage medium 40A of the image recording medium 40. In this case, the historical measured data is read from the storage medium 40A and a plurality of image recording conditions may be set, based on the measured data. Moreover, only the previous measured data may be configured to be stored in the storage medium 40A when the storage capacity of the storage medium 40A is small. In this case a plurality of image recording conditions may be set, centering on image recording conditions which have been stored in the storage medium 40A.

Moreover, there may be a configuration in which a test image and a predetermined image are recorded at the same time and the test image may be deleted later when the densities become within the allowable range.

As explained above, the invention has an excellent advantage that an image is recorded on a rewritable image-recording medium under the optimal image recording condition and preferable image quality can be maintained.

What is claimed is:

1. An image forming device comprising:
    a recording section that records a predetermined image on a rewritable image recording medium;
    a control section that controls the recording section to record a test image, distinct from the predetermined image, on the rewritable image recording medium;
    a detection section that detects an image characteristic value of the test image recorded on the rewritable image recording medium; and
    a determination section that determines whether the image characteristic value detected by the detection section is within an allowable range or not,
    wherein, when the image characteristic value detected by the detection section is within the allowable range, the control section controls the recording section to immediately form an output image on the rewritable image recording medium on which the test image has been recorded, the output image including the predetermined image and not including the test image.

2. The image forming device of claim 1, wherein the control section controls the recording section so that before the predetermined image is recorded on the rewritable image recording medium, the test image is recorded on the rewritable image recording medium, and when the image characteristic value detected by the detection section is outside the allowable range, image recording conditions for recording the predetermined image on the rewritable image recording medium are set based on the detected image characteristic value.

3. The image forming device of claim 1, wherein the control section controls the image forming device to discharge the rewritable image recording medium to a first and a second discharging tray based on how many times the image characteristic value has been detected, the first and the second discharging tray being connected to the image forming device.

4. The image forming device of claim 2, wherein the control section controls the recording section to record a plurality of test images on the rewritable image recording medium under a plurality of different image recording conditions, controls the detection section to detect an image characteristic value for each of the plurality of test images, and sets new image recording conditions based on the image characteristic values detected by the detection section for each test image recorded under the different image recording conditions.

5. The image forming device of claim 2, wherein the predetermined image is recorded on the rewritable image recording medium, based on the image recording conditions set by the control section, when the image characteristic value detected by the detection section is within the allowable range.

6. The image forming device of claim 1, wherein the rewritable image recording medium is provided with a storage medium on which an identification code is stored, the image forming device further comprising:
    a read section that reads the identification code stored on the storage medium; and
    a history storage section that stores histories of image recording conditions for the predetermined image recorded on the rewritable image recording medium, and histories of detection results of the detection section, wherein the control section stores the image recording conditions and the detection results in the history storage section together with the identification codes by the control section.

7. The image forming device of claim 6, wherein the control section sets image recording conditions for recording the predetermined image, based on the histories stored in the history storage section.

8. The image forming device of claim 1, wherein the rewritable image recording medium is provided with a storage medium onto which the control section stores image recording conditions for the predetermined image recorded on the rewritable image recording medium and detection results of the detection section.

9. The image forming device of claim 8, wherein the control section sets the image recording conditions for recording the predetermined image based on the image recording conditions and the detection results stored in the storage medium.

10. The image forming device of claim 1, wherein the detection section detects a display density of the test image, the display density being included in the image characteristic value.

11. The image forming device of claim 1, wherein the recording section writes the test image and the predetermined image on the rewritable image recording medium using an optical signal.

12. The image forming device of claim 1, wherein the image forming device forms the predetermined image without the test image on the rewritable image recording medium after the determination section determines the image determination value detected by the detection section is within the allowable range.

13. The image forming device of claim 1, wherein the image forming device deletes the test image recorded on the rewritable image recording medium.

14. The image forming device of claim 1, wherein the recording section records the predetermined image on the rewritable image recording medium by overwriting the predetermined image on the rewritable image recording medium on which the test image is recorded.

15. The image forming device of claim 1, further comprising:
    a first discharging tray;
    a second discharging tray;
    a counter that counts how many times the image characteristic value has been detected; and
    wherein the control section controls the image forming device to discharge the rewritable image recording medium to the first or the second discharging tray based on a value of the counter, the value indicating how many times the image characteristic value has been detected.

16. An image forming method comprising:
    recording a test image on a rewritable image recording medium based on predetermined image recording conditions set for a predetermined image, distinct from the test image, to be recorded on the rewritable image recording medium;
    detecting an image characteristic value of the test image recorded on the rewritable image recording medium;
    determining whether the detected image characteristic value is within an allowable range or not;
    immediately forming an output image on the rewritable image recording medium on which the test image has been recorded when the detected image characteristic value is within the allowable range, the output image including the predetermined image and not including the test image.

17. The image forming method of claim 16, the method further comprising recording the predetermined image on the rewritable image recording medium, based on the predetermined image recording conditions, when it is determined that the image characteristic value detected in the detecting step is within the allowable range.

18. The image forming method of claim 16, further comprising:
    changing the predetermined image recording conditions so that the detected image characteristic value approaches the allowable range, when it is determined that the image characteristic value detected in the detecting step is outside the allowable range; and
    subsequently re-recording the test image on the rewritable image recording medium, based on the changed image recording conditions.

19. The image forming method of claim 18, wherein the steps of:
    changing the image recording conditions;
    recording the test image on the rewritable image recording medium, based on the changed image recording conditions;
    detecting the image characteristic value; and
    determining whether the detected image characteristic value is within the allowable range,
    are repeated until it is determined that a current image characteristic value detected in the detecting step is within the allowable range.

20. The image forming method of claim 18, wherein the steps of:
    changing the image recording conditions;
    recording the test image on the rewritable image recording medium, based on the changed image recording conditions;

detecting the image characteristic value; and determining whether the detected image characteristic value is within the allowable range, are repeated until a number of repetitions reaches a predetermined number.

21. The image forming method of claim 16, the method further comprising storing at least one of image recording conditions for at least one image recorded on the rewritable image recording medium, and the detected image characteristic value, wherein the predetermined image recording conditions are defined based on at least one of the stored image recording conditions and image characteristic value.

22. The image forming method of claim 16, wherein the image characteristic value includes a display density of an image.

* * * * *